(12) United States Patent
Hershey et al.

(10) Patent No.: US 12,537,615 B2
(45) Date of Patent: Jan. 27, 2026

(54) COMMON FRAMEWORK FOR SENSOR AND COMMUNICATION MODELS

(71) Applicant: Raytheon Company, Arlington, VA (US)

(72) Inventors: Paul C. Hershey, Ashburn, VA (US); Vikram A. Prasad, Reston, VA (US); Marcus Alton Teter, Belgrade, MT (US)

(73) Assignee: Raytheon Company, Arlington, VA (US)

( * ) Notice: Subject to any disclaimer, the term of this patent is extended or adjusted under 35 U.S.C. 154(b) by 1046 days.

(21) Appl. No.: 17/506,847

(22) Filed: Oct. 21, 2021

(65) Prior Publication Data

US 2023/0125362 A1 Apr. 27, 2023

(51) Int. Cl.
*H04B 17/391* (2015.01)
*G06F 30/18* (2020.01)
*G06F 30/20* (2020.01)
*G06F 111/02* (2020.01)

(52) U.S. Cl.
CPC ......... *H04B 17/3912* (2015.01); *G06F 30/18* (2020.01); *G06F 30/20* (2020.01); *G06F 2111/02* (2020.01)

(58) Field of Classification Search
CPC ..... H04B 17/3912; G06F 30/18; G06F 30/20; G06F 2111/02
See application file for complete search history.

(56) References Cited

U.S. PATENT DOCUMENTS 10,651,955 B2 * 5/2020 Scaglione ............ H04B 17/309
2015/0205760 A1 * 7/2015 Hershey ................. G06N 20/00
702/181

(Continued)

OTHER PUBLICATIONS

Md. L. Rahman et al.; "Framework for a Perceptive Mobile Network Using Joint Communication and Radar Sensing"; IEEE Transactions on Aerospace and Electronic Systems vol. 56, No. 3 (Year: 2019).*

(Continued)

*Primary Examiner* — Rehana Perveen
*Assistant Examiner* — Nupur Debnath
(74) *Attorney, Agent, or Firm* — Schwegman Lundberg & Woessner, P.A.

(57) ABSTRACT

Systems, devices, methods, and computer-readable media for concurrent visualization of sensor and communications operations. A method can include receiving mission data indicating a target, a sensor, a communications system, and an operation to be performed regarding the target, identifying one or more operational layer, functional layer, and physical layer models for the sensor and communications system, and a physical layer model for weather, identifying, based on a comparison of the physical models of the sensor and communications system to a propagation equation, any gaps or inconsistencies between the physical models of the sensor and communications system and the propagation equation, and executing a simulation model resulting in a visual display of execution of the mission using the sensor and the communications system, the simulation model generated based on a filler model that fills any identified gaps or fixes any identified inconsistencies.

20 Claims, 5 Drawing Sheets

(56) References Cited

U.S. PATENT DOCUMENTS

2019/0213285 A1* 7/2019 Baggeroer ........... G06Q 10/063
2022/0061236 A1* 3/2022 Guan ....................... A01G 7/00

OTHER PUBLICATIONS

Dr. Richard Shirkey; "Adding Weather to Your Simulation"; 13th Annual Conference of the White Sands Chapter of the International Test (Year: 2007).*

John Maynard; "Free Space Laser Communications: A Historical Perspective" Defense Systems Information Analysis Center (DSIAC) (Year: 2019).*

Paul C. Hershey et al.; "System of Systems for Quality-of-Service Observation and Response in Cloud Computing Environments"; IEEE Systems Journal, vol. 9, No. 1, Mar. 2015 (Year: 2015).*

Husheng Li et al.; "Communication Infrastructure Design in Cyber Physical Systems with Applications in Smart Grids: A Hybrid System Framework"; IEEE Communications Surveys & Tutorials, vol. 16, No. 3, Third Quarter 2014 (Year: 2014).*

Tuyen P. Truong et al.; "An Approach of Concurrent Communications for Distributed Sensing Networks"; Journal of Communications vol. 15, No. 4, Apr. 2020 (Year: 2020).*

* cited by examiner

COMMON FRAMEWORK FOR SENSOR AND COMMUNICATION MODELS

BACKGROUND

Emerging threat scenarios require longer range targeting and identification of targets, as well as high bandwidth and secure communications from multi-domain (space, air, land, sea, and undersea) platforms. The platforms can be manned or unmanned. Legacy platforms have size, weight, and power (SWaP) constraints that can hinder their ability to provide increased capability. Longer term, future platforms can help provide a capability for multi-function active transmitters and receivers such as can be required for anti-access or aerial denial applications. High bandwidth communications channels can replace current radio frequency (RF) capabilities. There does not exist a sufficient modeling framework to support integrated modeling of sensors and communications. Embodiments provide such a platform.

DETAILED DESCRIPTION

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

Embodiments provide a framework through which communications and sensor models can be homogenized and concurrently operated, such as for concurrent visualization of a scenario and the sensor and communications operating in the scenario. Embodiments can extend parametric physical layer models for sensors and communications waveforms to models that are usable for physical, functional, and operational analysis. Embodiments can provide a hierarchical modeling process that is built on three layers, namely an operational layer, a functional layer, and a physical layer. The three layers provide an ability to unite diverse, layer-specific models. Lower layer models can be integrated with higher layer models using an adaptive modeling approach that fills gaps between the models. The gaps can include one or more user or device interfaces, functionality, formatting, and scaling. The adaptive modeling ensures data integrity between layers. The framework supports radio frequency (RF), optical, laser, and other analog and digital sensor and communications models. The models can include communications and sensor (e.g., imaging) models. Embodiments provide an ability for concurrent multi-mission modeling, concurrent multi-domain modeling, and automated testing within a common infrastructure. The multi-mission modeling can include diverse platforms, diverse targets, and/or diverse mission activities. The domains can include space, air, ground, sea, undersea, or cyber. Visualization of the models concurrently provides an operator with an exploratory environment to validate a mission scenario and concept of operations (CONOPS) prior to deployment of the mission scenario.

Figure 1:
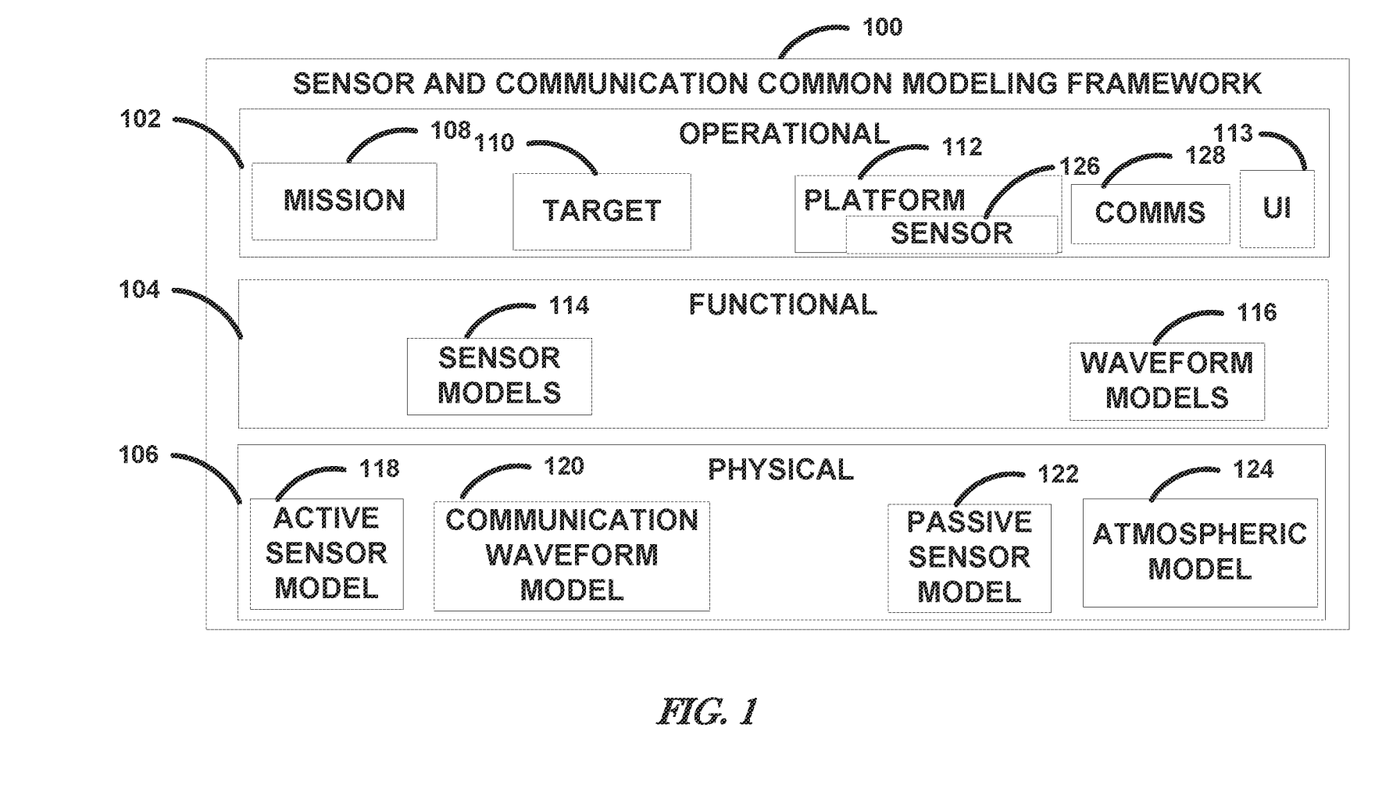
FIG. 1 illustrates, by way of example, a diagram of an embodiment of a hierarchical framework for concurrent visualization of communications and sensor operation.

FIG. 1 illustrates, by way of example, a diagram of an embodiment of a hierarchical system 100 for concurrent visualization of communications and sensor operation. The communications and sensors can be provided by devices that operate based on same technology. For example, RF communication and RF sensor models can be united and viewed concurrently or optical communication and optical sensor models can be united and the operation and model results of such sensors and communication can be viewed concurrently.

The system 100 is vertically and horizontally extensible. Horizontally extensible in that the system 100 can provide simultaneous visualization of multiple missions (e.g., two platforms transferring data while also collecting data on targets, two platforms with respective sensors and communications systems, or the like). Vertically extensible in that the number of models per layer can increase. In other words, the system 100 is "elastic" and can scale according to the dynamic needs of a mission 108.

The hierarchical system 100 includes an operational layer 102, a functional layer 104, and a physical layer 106. The operational layer 102 is the layer through which a user defines and visualizes simulation of their scenario. The operational layer 102 is the outward facing layer to those with "boots on the ground" or otherwise in charge of managing concept of operations (CONOPS) of a mission.

The operational layer 102 includes a user interface 13 through which a user can identify the mission 108, a platform 112, and a target 110. The mission 108 can be defined based on a function and a timeframe. The function can be to locate and image the target 110, locate and disable the target 110, locate and recover the target 110, locate and monitor the target 110, or the like. The operational layer 102 can include one or more models that provide a visual depiction of the sensor 126 and communications system 128 operation in attempting the mission 108. Examples of operational layer models include those generated using the advanced framework for simulation integration and modeling (AFSIM) from the Air Force Research Laboratory, Real-Time Battlefield Emulator (RTBE), and System Toolkit (STK) from Analytical Graphics, or the like.

The target 110 is the subject of the mission 108. The target 110 is the entity or object that is to be operated on in the manner defined by the function of the mission 108. The target 110 can include a hostile person, hostile object, hostile facility, friendly person, friendly object, or friendly facility.

The platform 112 is the vehicle on which a sensor or communications device resides. The platform 112 can include a car, truck, tank, ship, boat, submarine, plane, drone, helicopter, satellite, or the like, whether manned or unmanned.

The identified mission 108, target 110, and platform 112 inform which generic sensor model, communication waveform model, and target model to use to provide a visual representation of the mission 108. These models are high-level, visual models. These models are accessible through the functional layer 104. The models of the functional layer 104 can include models of the functions of the sensor 126 or communications system 128. An example of an optical sensor 126 includes a laser detection and ranging (LADAR) sensor. An example of an optical communications system 128 includes a laser communications system. Example functional layer models include those generated using Universal Sensor Model, M3T (Mission Management Modeling Tool), EMANE (Extendable Mobile Ad-hoc Network Emulator), or the like.

The physical layer 106 includes physics-based models for the sensor 126 and the communications system 128. The physics-based models can include an active sensor model 118, a communication waveform model 120, a passive sensor model 122, and an atmospheric model 124. Not all of the models 118, 120, 122, and 124 are used in every scenario. The physics-based models 118, 120, 122, and 124 reflect metrics that indicate the physical characteristics of the sensor 126, the communications system 128, and the weather or atmosphere. Example physical layer models include those created using QuickSim, TrackerSim, Airborne Infrared Search and Track (ABIRST), RIFS, Geometric Sensor Model, Extendable Mobile Ad-hoc Network Emulator (EMANE), Hufnagel-Valley (H-V), Submarine Laser Communication (SLC)-Night, Clear1, Moderate Resolution Atmospheric Transmission (MODTRAN), or the like.

A laser communications system and laser detection and ranging (LADAR) can both operate using a laser, thus a physics model of laser light propagation can be used for both the optical sensor and the optical communications system. Also, propagation effects, such as weather and atmospheric effects, for the optical sensor and the optical communications system can be governed by a same model. This simplifies the operation of the overall model compared to scenarios that include sensors and communication systems that are modelled using different physics models.

A comprehensive physics model for laser communications can be represented as follows:

$$P_R = P_T G_T L_T L_P L_S L_A L_R G_R + P_{other} + P_{scatter}$$

where $P_R$ is the power received at a communications receiver, $P_T$ is the power transmitted at a communications transmitter, $G_T$ is the gain of the communications transmitter, $L_T$ is the power losses of the communications transmitter, $L_P$ is the losses of pointing the laser for communications, $L_S$ is the free space path loss (losses from traversing the space between the receiver and transmitter), $L_A$ is the losses from atmosphere, $L_R$ is the losses at the receiver, $G_R$ is the gain at the receiver, $P_{scatter}$ is the transmitted power scatter out of the target path that ends up at the receiver anyway, and $P_{other}$ is other power received (e.g., noise or other device transmission).

A comprehensive physics model for imaging using a laser sensor can be represented as follows:

$$P_R = P_T f_T (f_{T-tgt}(f_{tgt}+f_{bg})f_{tgt-R}+f_{scat})f_R + P_{other}$$

where $P_R$ is the power received at a light receiver, $P_T$ is the power transmitted at a laser, $f_T$ is the fraction of power lost by transmitter optics, $f_{T-tgt}$ is the fraction of power lost between the laser and object being imaged, $f_{tgt}$ is the is the fraction of incident power reflected by the object being imaged, $f_{bg}$ is the fraction of power reflected by the background near the object being imaged, $f_{tgt-R}$ is the fraction of power lost between the object being imaged and the laser, $f_{scat}$ is the fraction of power leaving the laser that scattered into the receiver outside of the path of scatter from the object being imaged, $f_R$ is the fraction of power lost by receiver optics, and $P_{other}$ is other power received at the receiver (e.g., noise or other device transmission).

These models, while they appear different and the operations seem fundamentally different, they both model production and reception of laser light. Further, the variables of these models can be mapped to each other. Table 1 summarizes a mapping from the laser communications model to the laser sensor model.

TABLE 1

Mapping of laser communications model parameters to laser sensor model parameters

| LASER COMMUNICATIONS MODEL PARAMETER | LASER SENSOR MODEL PARAMETER |
|---|---|
| $P_R$ | $P_R$ |
| $P_T$ | $P_T$ |
| $G_T$ & $L_T$ | $f_T$ |
| $L_P$, $L_S$, & $L_A$ | $f_{T-tgt}$ & $f_{tgt-R}$ |
| $L_R$ & $G_R$ | $f_R$ |
| $P_{scatter}$ | $f_{scat}$ |
| $P_{other}$ | $P_{other}$ |

The parameters not mapped between the laser sensor model and the laser communications model include the reflection parameters from the laser sensor model, namely $f_{tgt}$ and $f_{bg}$.

Figure 2:
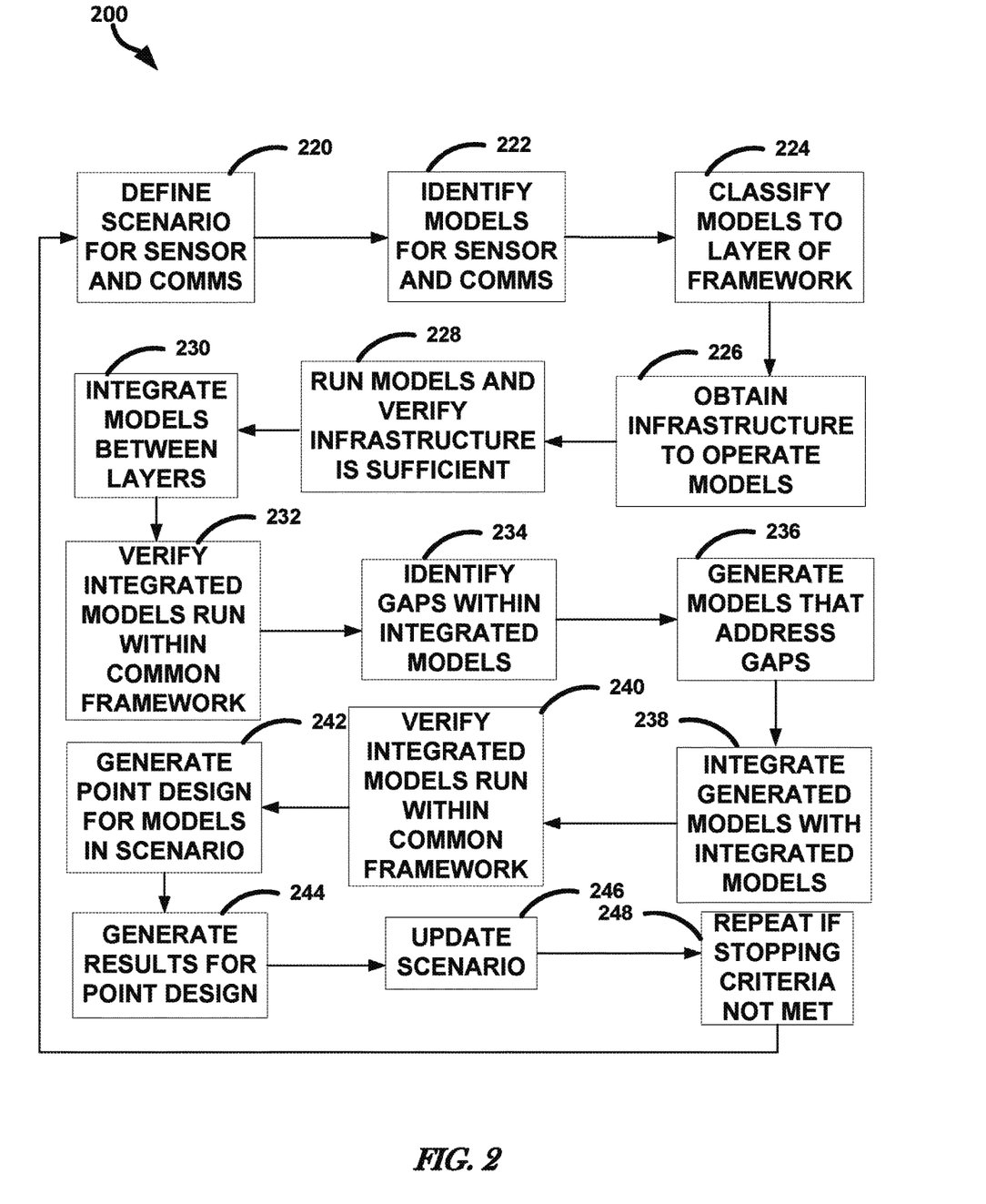
FIG. 2 illustrates, by way of example, a flow diagram of an embodiment of a technique for model integration and providing concurrent visualization of sensor and communications system performance.

FIG. 2 illustrates, by way of example, a flow diagram of an embodiment of a technique 200 for model integration across layers and providing concurrent visualization of sensor and communications system performance. The technique 200 as illustrated includes defining a scenario for sensor 126 and communications system 128 operations, at operation 220; identifying models for sensor and communications systems, at operation 222; classifying models to the layer of the framework, at operation 224; obtaining computer infrastructure to operate the identified models, at operation 226; running the models on the obtained infrastructure and verifying that the obtained infrastructure is sufficient, at operation 228; integrating models between the framework layers, at operation 230; verifying the models run within a common framework, at operation 232; identifying gaps within the integrated models, at operation 234; generating further models that address the identified gaps in the models, at operation 236; integrate the generated models with the integrated models, at operation 238; verifying the integrated models run within the common framework, at operation 240; generating a point design for models in the scenario, at operation 242; generating results for the point design, at operation 244; updating the scenario based on the results, at operation 246; and repeating (back to operation 220) if the stopping criteria is not met.

The operation 220 can be performed by the user through the UI 113. The scenario (sometimes called the mission 108) can include locating an object and communicating the location of the object, classifying an object, and communicating the classification of the object, destruction of the target 110 and communication of mission success or failure, or the like. The operation 220 can include identifying the target 110, the platform 112, the sensor 126, and the communications system 128.

The operation 222 can include identifying the sensor model 114, the waveform model 116, the atmospheric model 124 (if more than one atmospheric model is available), physics-based sensor model (the active sensor model 118 or the passive sensor model 122), and communication waveform model 120. The operation 222 can be performed using the UI 113. The UI 113 can be configured to help the user select the appropriate models. In some embodiments, there is only one model available, and that model can be automatically selected in such instances.

The operation 224 can include determining the type of model (e.g., a functional model, visual model, or a physics-based model) and the corresponding layer (functional layer 104, operational layer 102, or physical layer 106) to which the model belongs. Separate models can be specified at the functional layer 104 and the physical layer 106 for the sensor 126 and the communications system 128. The operation 224 can include verifying that the minimum number of models to be defined at each layer to perform the simulation are defined.

The operation 226 can include identifying properties of computer equipment required to execute a combined model that provides a visualization of the sensor 126 and communications system 128 operation. The properties can include processor speed, number of cores, amount of read only memory (ROM), amount of random-access memory (RAM), platform (e.g., operating system), or the like. The operations 226 can include determining whether the models can be operated on a same computer system or require different computer systems and whether virtualization or porting of the computer code can be performed to allow the model to run on a different computer system.

At operation 228, the models can be loaded on the identified computer system and executed. The operation 228 can allow for identification of any bugs, required updates, or other potential issues with the identified computer system. The infrastructure can be deemed sufficient if it operates the models without error and at sufficient speed (does not benefit from more processing or memory bandwidth or speed).

At operation 230, the models from the physical layer 106 can be integrated with the models from the functional layer 104. This integration can include generating a multi-threaded model that comprises the individual models as threads as well as propagating outputs of the models from the physical layer 106 to inputs of the models from the functional layer 104. The operation 230 can include splitting a model that spans the physical layer 106 and the functional layer 104 into a physics-based model portion in the physical layer 106 and a functional-level model in the functional layer 104. An interface layer can be identified that passes data from the physics-based model in the physical layer 106 to the functional-level model in the functional layer 104.

The operation 232 can include performing periodic testing of the integrated models to ensure that the models are operating in the computer system environment. The operation 232 can include verifying that the integrated model produces a same output as the model did before integration (splitting and operating the model as two separate models that communicate with each other).

The operation 234 can include comparing the models to parameters of a propagation equation to determine if the models account for all of the parameters of the propagation equation and whether the models use any parameters that are not consistent with the propagation equation. If any of the models do not account for a parameter of the propagation equation, that is considered a gap in the model. If any of the models combine parameters of the propagation equation, this also can be considered a gap in the model. The propagation equation is a function based on an environment in which the sensor 126 and communications system 128 operate. The environment is defined as the weather, terrain, atmospheric conditions, or the like between the sensor 126 or communications system 128 and the target 110. The propagation equation indicates how the weather, terrain, and atmospheric conditions affect a transmission from the sensor 126 or communications system 128 and ultimately how the mission 108 is affected by the environment. Example propagation equations are provided elsewhere as a laser communications model and a laser sensor model. A gap in the model is a parameter that is not accounted for by the model. A communications model or sensor model that does not account for $P_{other}$ can be considered a gap.

At operation 236, the gap information from operation 234 can be used to generate a gap model that handles the identified gap(s). The gap model generated at operation 236, when integrated with the model that includes the gap (any of the models of the system 100), makes the model with the gap conform to and consider all of the parameters of the propagation equation. Consider the communications model or sensor model that does not account for $P_{other}$. This lack of accounting can be considered a gap in the model and another model (a "gap model") can be generated that accounts for the $P_{other}$. The gap model can be matured using a range of expected input data and expected output. Matured in this context means to fully develop the gap model so that it can process the data including ingesting the data and analyzing the data to fulfill the model execution. The gap model can be tested to determine whether it operates independent of the system 100. Test data can be prepared that will test whether the gap model, when integrated with the model with the gap, handles the gap conditions, and non-gap conditions appropriately.

At operation 238, the gap model(s) (the generated model(s)) can be integrated similar to operation 230. At operation 240, the further integrated models (the integrated models integrated with the gap models are considered further integrated models) can be verified to operate (in integrated form, not individually) in the system 100.

The operation 242 can include building connections between models of different layers in the system 100. The operation 242 can include establishing an end-to-end flow of the system 100 operation. A variety of inputs, with a known expected output can be provided to the models to gut check whether the further integrated models operate as expected. A point design is an integrated set of models spanning operational, functional, and physical layers that represents an end-to-end system of models ("system of systems") at a point in time during the mission 108.

At operation 244, the point design can be tested using the input. The further integrated models can be executed based on the input from the operation 242 and a series of outputs can be generated based on the input. The output can be analyzed by an operator or other user. If the output is not satisfactory (indicates that the mission is not going to be successful to a threshold probability) the scenario can be updated. The scenario in this context means the sensor 126, communications system 128, platform 112, target 110, timeline of the mission 108, or the like.

At operation 248, the process can be repeated if the stopping criteria are not met. The stopping criteria can include generating a probability of success greater than a threshold probability. The stopping criteria can be subjective. A user who is generating and performing the scenario can view the results of the model execution and decide whether they are satisfied or whether they would like to change a portion of the further integrated model execution.

Figure 3:
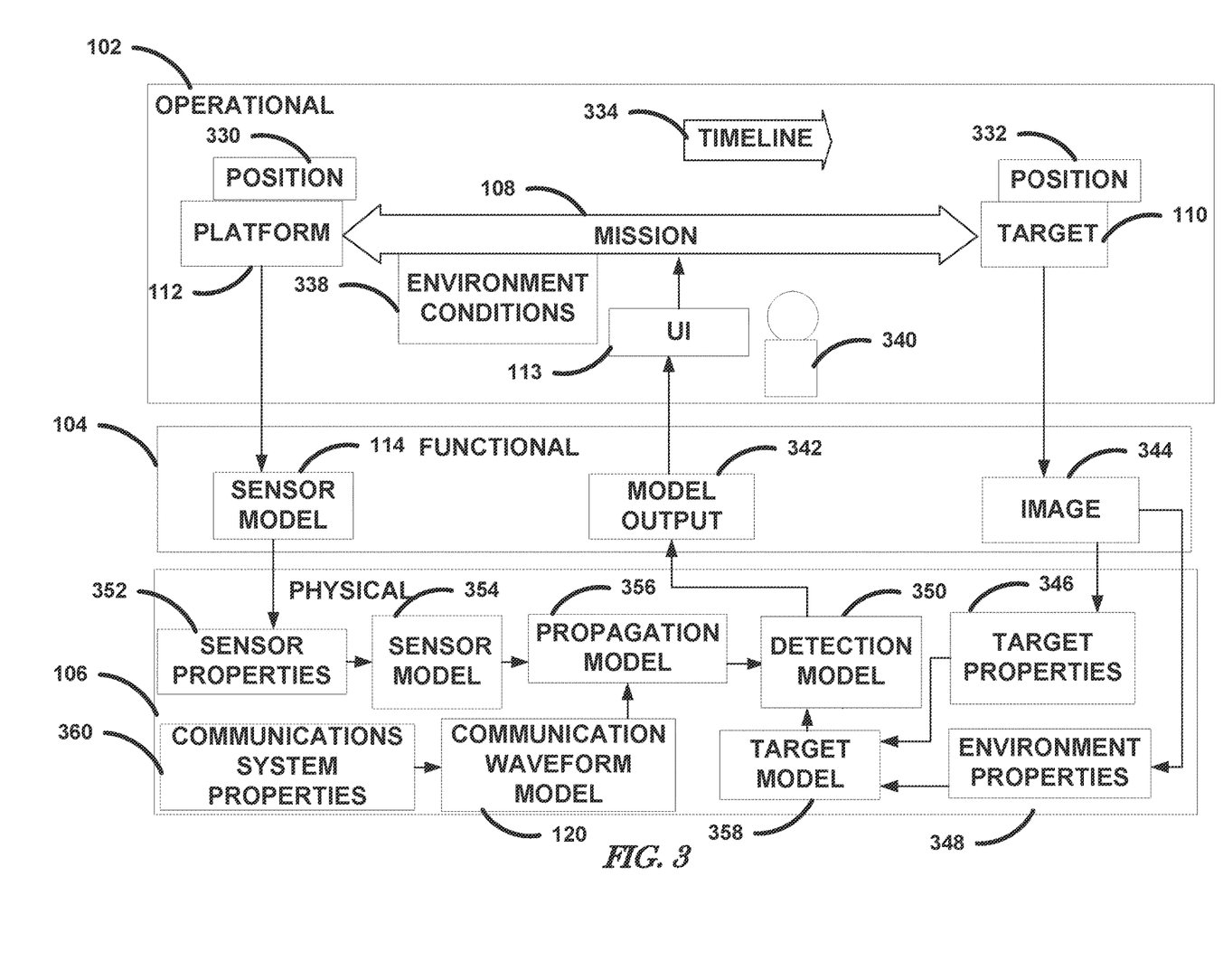
FIG. 3 illustrates, by way of example, a flow diagram of an embodiment of the operations of the layers of the framework.

FIG. 3 illustrates, by way of example, a flow diagram of an embodiment of the operations of the layers of the system 100. At the operational layer 102, a user 340 can define a mission objective 336, timeline 334, platform 112, and target 110 through the UI 113. The environment conditions 338 can be input into the operational layer 102 using weather data that is from a website, satellite, weather station, or the like. A position 330 of the platform 112 or a position 332 of the target 110 can be provided through the UI 113 or through an external source, such as an intelligence, surveillance, reconnaissance (ISR) device. The timeline 334 defines a date and timeframe about which the mission 108 is to be performed.

The platform 112 can include a sensor thereon. The sensor model 114 can be a functional level, visual model of the sensor. An image 344 of the target 110 can be provided to the physical layer 106. The image 344 can help define target properties 346 and environment properties 348 of the target 110. Geographical relief, buildings, persons, objects, roads, windows, vents, or the like can be identified and recorded as background properties. Such items can be identified by a human analyst, machine learning (ML), a combination thereof, or the like, and recorded as environment properties 348. The target properties 346 include information sufficient to separate the target 110 from the remainder of the image 344. The target properties 346 can indicate a size, shape, type (human, object, vehicle, building, etc.) of target, registered geolocation of the target 110, whether the target 110 is mobile, or the like. A target model 358 can receive the target properties 346 and the environment properties 348 and use those to simulate the target 110 and the environment around the target 110 during the timeline 334.

The sensor 126 can have sensor properties 352 that are not modeled by the sensor model 114. The sensor properties 352 can be physical parameters of the sensor 126 that dictate the physics-based operation of the sensor 126. The physics-based operation of the sensor 126 can be simulated using the sensor model 354.

Similarly, the communications system 128 can have communications system properties 360 that are not modeled in the functional layer model of the communications system 128. The communications system properties 360 can dictate the physics-based operation of the communications system 128. The physics-based operation of the communications system 128 can be simulated using the communication waveform model 120.

Since both the sensor 126 and the communications system 128 use a same type of waveform for operation, for example RF or optical, a same propagation model 356 can be used to simulate both the sensor 126 operation in the environment of the image 344 and the communications system 128 operation in the environment of the image 344.

The detection model 350 combines the propagation model 356 and the target model 358, along with the position 330, 332 of the platform 112 and the target 110, and the environment conditions 338, the image 344, the sensor model 114 and the waveform model 116 to simulate deploying the sensor 126 and the communications system 128 to satisfy the mission 108. A visual display of the mission 108 being carried out by the sensor 126 and the communications system 128 can be provided on the UI 113. The model output 342 can provide the visual display, an indication of a probability of mission success, or a combination thereof.

Figure 4:
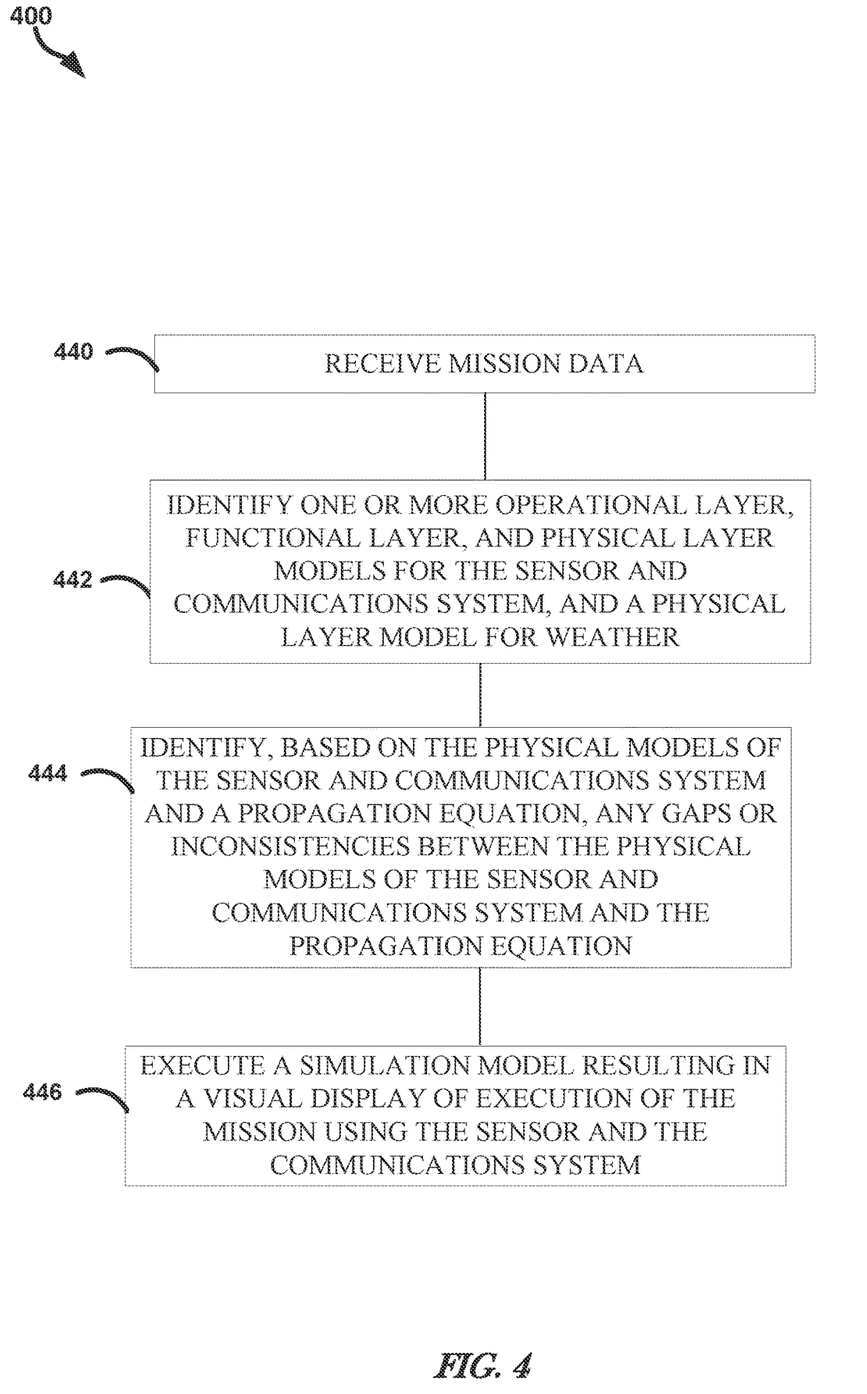
FIG. 4 illustrates, by way of example, a diagram of an embodiment of a method for concurrent simulation of sensor and communications system operation in satisfaction of the mission.

FIG. 4 illustrates, by way of example, a diagram of an embodiment of a method 400 for concurrent simulation of sensor 126 and communications system 128 operation in satisfaction of the mission 108. The method 400 as illustrated includes receiving (e.g., by a user interface) mission data, at operation 440; identifying one or more operational layer, functional layer, and physical layer models for the sensor and communications system, and a physical layer model for weather, at operation 442; identifying (e.g., based on a comparison of the physical models of the sensor and communications system to a propagation equation), any gaps or inconsistencies between the physical models of the sensor and communications system and the propagation equation, at operation 444; and executing a simulation model resulting in a visual display of execution of the mission using the sensor and the communications system, at operation 446. The simulation model can be generated based on a filler model that fills any identified gaps or fixes any identified inconsistencies. The mission data can indicate one or more of a target, a sensor, a communications system, or an operation to be performed regarding the target. The propagation equation can define physical propagation of a wave from the sensor and a wave from the communications system The method 400 can further include generating the filler model that fills any identified gaps or fixes any identified inconsistencies. The method 400 can further include combining the filler model, operational layer, functional layer, and physical layer models of the sensor, communications system, and weather into the simulation model. The method 400 can further include, wherein the sensor and the communications system both operate using respective lasers. The method 400 can further include, wherein the sensor and the communications circuitry both operate using radio frequency (RF) signals.

The method 400 can further include, wherein the mission includes locating the target, identifying the target, or delivering a payload to the target.

The method 400 can further include combining the physical layer model of the sensor and the physical layer model of the communications system into a propagation model before comparing the propagation model to the propagation equation. The method 400 can further include verifying that the propagation model is executable within a specified computer framework. The method 400 can further include verifying that the simulation model is executable within the specified computer framework before executing the simulation model.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 5:
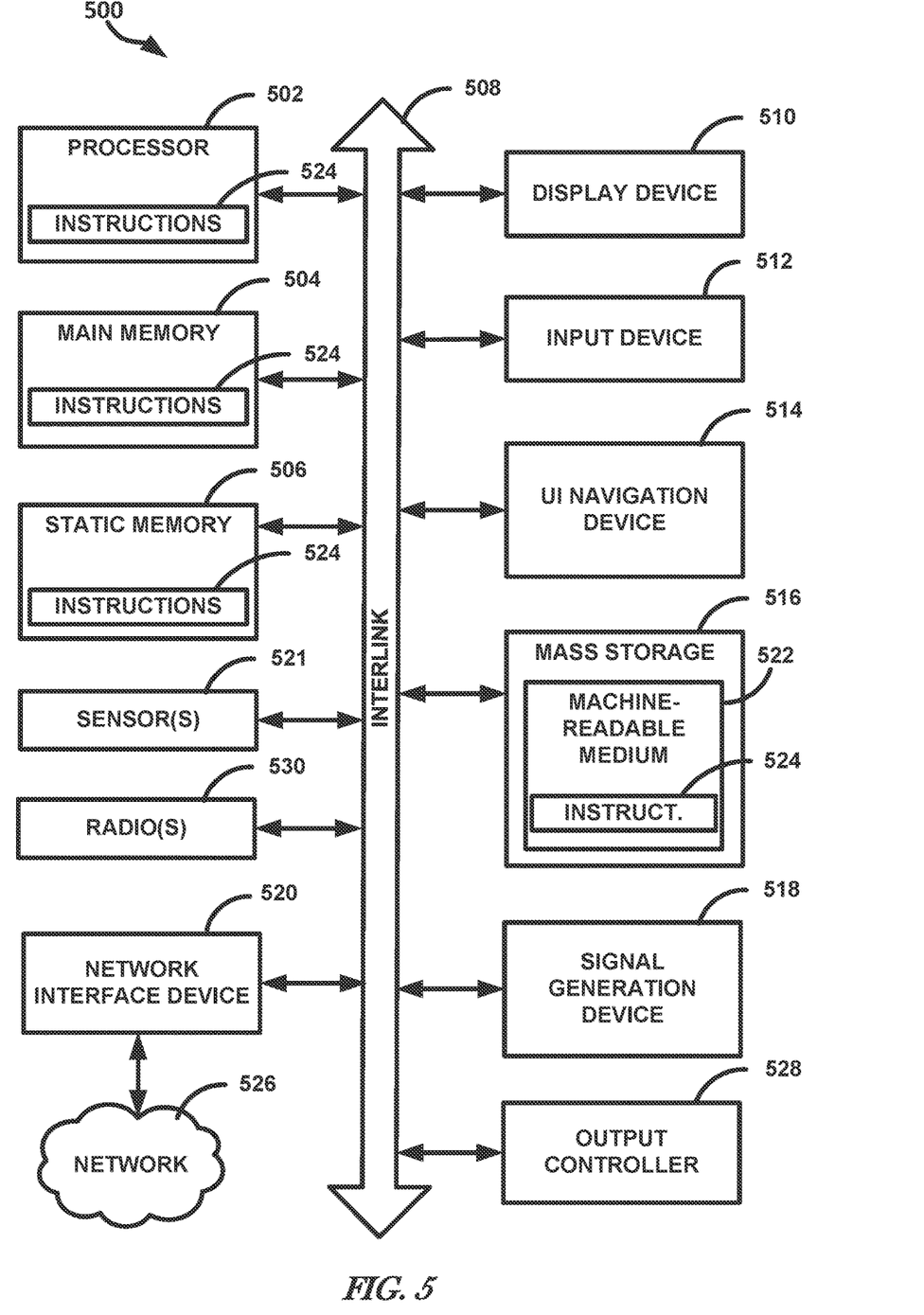
FIG. 5 illustrates, by way of example, a block diagram of an embodiment of a machine in the example form of a computer system within which instructions, for causing the machine to perform any one or more of the methodologies discussed herein, may be executed.

FIG. 5 illustrates, by way of example, a block diagram of an embodiment of a machine in the example form of a computer system 500 within which instructions, for causing the machine to perform any one or more of the methodologies discussed herein, may be executed. One or more of can be implemented or performed by the computer system 500. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 521 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), a network interface device 520, and radios 530 such as Bluetooth, WWAN, WLAN, and NFC, permitting the application of security controls on such protocols.

The machine 500 as illustrated includes an output controller 528. The output controller 528 manages data flow to/from the machine 500. The output controller 528 is sometimes called a device controller, with software that directly interacts with the output controller 528 being called a device driver.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504, the static memory 506, and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Additional Example

Example 1 can include a system comprising a user interface, and processor circuitry coupled to the user interface, the processor circuitry configured to receive, by the user interface, mission data indicating a target, a sensor, a communications system, and an operation to be performed regarding the target, identify one or more operational layer, functional layer, and physical layer models for the sensor and communications system, and a physical layer model for weather, identify, based on a comparison of the physical models of the sensor and communications system to a propagation equation that defines physical propagation of a wave from the sensor and a wave from the communications system, any gaps or inconsistencies between the physical models of the sensor and communications system and the propagation equation, and execute a simulation model resulting in a visual display of execution of the mission using the sensor and the communications system, the simulation model generated based on a filler model that fills any identified gaps or fixes any identified inconsistencies.

In Example 2, Example 1 can further include, wherein the processor circuitry is further configured to generate the filler model that fills any identified gaps or fixes any identified inconsistencies, and combine the filler model, operational layer, functional layer, and physical layer models of the sensor, communications system, and weather into the simulation model.

In Example 3, at least one of Examples 1-2 can further include, wherein the sensor and the communications system both operate using respective lasers.

In Example 4, at least one of Examples 1-3 can further include, wherein the sensor and the communications circuitry both operate using radio frequency (RF) signals.

In Example 5, at least one of Examples 1-4 can further include, wherein the mission includes locating the target, identifying the target, or delivering a payload to the target.

In Example 6, at least one of Examples 1-6, can further include, wherein the processor circuitry is further configured to combine the physical layer model of the sensor and the physical layer model of the communications system into a propagation model before comparing the propagation model to the propagation equation.

In Example 7, Example 6 can further include, wherein the processor circuitry is further configured to verify that the propagation model is executable within a specified computer framework.

In Example 8, Example 7 can further include, wherein the processor circuitry is further configured to verify that the simulation model is executable within the specified computer framework before executing the simulation model.

Example 9 includes a method for concurrent visualization of communication and sensor models, the method comprising receiving, by a user interface, mission data indicating a target, a sensor, a communications system, and an operation to be performed regarding the target, identifying one or more operational layer, functional layer, and physical layer models for the sensor and communications system, and a physical layer model for weather, identifying, based on a comparison of the physical models of the sensor and communications system to a propagation equation that defines physical propagation of a wave from the sensor and a wave from the communications system, any gaps or inconsistencies between the physical models of the sensor and communications system and the propagation equation, and executing a simulation model resulting in a visual display of execution of the mission using the sensor and the communications system, the simulation model generated based on a filler model that fills any identified gaps or fixes any identified inconsistencies.

In Example 10, Example 9 can further include generating the filler model that fills any identified gaps or fixes any identified inconsistencies, and combining the filler model, operational layer, functional layer, and physical layer models of the sensor, communications system, and weather into the simulation model.

In Example 11, at least one of Examples 9-10 can further include, wherein the sensor and the communications system both operate using respective lasers.

In Example 12, at least one of Examples 9-11 can further include, wherein the sensor and the communications circuitry both operate using radio frequency (RF) signals.

In Example 13, at least one of Examples 9-12 can further include, wherein the mission includes locating the target, identifying the target, or delivering a payload to the target.

In Example 14, at least one of Examples 9-13 can further include combining the physical layer model of the sensor and the physical layer model of the communications system into a propagation model before comparing the propagation model to the propagation equation.

In Example 15, Example 14 can further include verifying that the propagation model is executable within a specified computer framework.

In Example 16, Example 15 can further include verifying that the simulation model is executable within the specified computer framework before executing the simulation model.

Example 17 can include a non-transitory machine-readable medium including instructions that, when executed by a machine, cause the machine to perform operations for concurrent visualization of sensor and communications models, the operations comprising the method of one of Examples 9-16.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A system comprising:
   a user interface; and
   processor circuitry coupled to the user interface, the processor circuitry configured to:
   receive, by the user interface, mission data indicating a target, a sensor, a communications system, and an operation to be performed regarding the target;
   obtaining an operational layer model, functional layer models, and physical layer models for the sensor and communications system, and a physical layer model for weather, the operational layer model provides a visualization of a simulation of a mission associated with the mission data, the physical layer models include respective physics-based models of the sensor and the communications system, respectively, and the functional layer models includes models that simulate functions of the sensor and models that simulate functions of the communications system;
   identify, based on a comparison of the physic s-based models of the sensor and communications system to a propagation equation that defines physical propagation of a wave from the sensor and a wave from the communications system, any gaps, or inconsistencies between the physics-based models of the sensor and communications system and the propagation equation;
   generate a filler model that fills the identified gaps or fixes any identified inconsistencies;
   combine the filler model, operational layer, functional layer, and physical layer models of the sensor, communications system, and weather into a simulation model;
   execute the simulation model resulting in a visual display of execution of the mission using the sensor and the communications system and a determination of a probability of mission success;
   determine the probability of mission success satisfies a specified criterion; and
   causing a platform to execute the mission responsive to determining the probability of mission success satisfies the specified criterion.

2. The system of claim 1, wherein
   combine the filler model, operational layer, functional layer, and physical layer models of the sensor, communications system, and weather into the simulation model combining the filler model, operational layer, functional layer, and physical layer models includes coupling outputs from the operational layer model to inputs of the functional layer models, coupling outputs from the functional layer models to inputs of the physical layers models, coupling outputs of the physical layer models to inputs of the operations layer model, and coupling filler model outputs to either the physical model of the sensor or the physical model of the communications system.

3. The system of claim 1, wherein the sensor and the communications system both operate using respective lasers.

4. The system of claim 1, wherein the sensor and the communications circuitry both operate using radio frequency (RF) signals.

5. The system of claim 1, wherein the mission includes locating the target, identifying the target, or delivering a payload to the target.

6. The system of claim 1, wherein the processor circuitry is further configured to combine the physical layer model of the sensor and the physical layer model of the communications system into a propagation model before comparing the propagation model to the propagation equation.

7. The system of claim 6, wherein the processor circuitry is further configured to verify that the propagation model is executable within a specified computer framework.

8. The system of claim 7, wherein the processor circuitry is further configured to verify that the simulation model is executable within the specified computer framework before executing the simulation model.

9. A method for concurrent visualization of communication and sensor models, the method comprising:
receiving, by a user interface, mission data indicating a target, a sensor, a communications system, and an operation to be performed regarding the target;
obtaining an operational layer model, functional layer models, and physical layer models for the sensor and communications system, and a physical layer model for weather, the operational layer model provides a visualization of a simulation of a mission associated with the mission data, the physical layer models include respective physics-based models of the sensor and the communications system, respectively, and the functional layer models includes models that simulate functions of the sensor and models that simulate functions of the communications system;
identifying, based on a comparison of the physics-based models of the sensor and communications system to a propagation equation that defines physical propagation of a wave from the sensor and a wave from the communications system, any gaps or inconsistencies between the physics-based models of the sensor and communications system and the propagation equation;
generating a filler model that fills the identified gaps or fixes any identified inconsistencies;
combining the filler model, operational layer, functional layer, and physical layer models of the sensor, communications system, and weather into a simulation;
executing the simulation model resulting in a visual display of execution of the mission using the sensor and the communications system and a determination of a probability of mission success;
determining the probability of mission success satisfies a specified criterion; and
causing a platform to execute the mission responsive to determining the probability of mission success satisfies the specified criterion.

10. The method of claim 9, wherein further comprising:
combining the filler model, operational layer, functional layer, and physical layer models includes coupling outputs from the operational layer model to inputs of the functional layer models, coupling outputs from the functional layer models to inputs of the physical layers models, coupling outputs of the physical layer models to inputs of the operations layer model, and coupling filler model outputs to either the physical model of the sensor or the physical model of the communications system.

11. The method of claim 9, wherein the sensor and the communications system both operate using respective lasers.

12. The method of claim 9, wherein the sensor and the communications system both operate using radio frequency (RF) signals.

13. The method of claim 9, wherein the mission includes locating the target, identifying the target, or delivering a payload to the target.

14. A non-transitory machine-readable medium including instructions that, when executed by a machine, cause the machine to perform operations for concurrent visualization of sensor and communications models, the operations comprising:
receiving, by a user interface, mission data indicating a target, a sensor, a communications system, and an operation to be performed regarding the target;
obtaining an operational layer, functional layer models, and physical layer models for the sensor and communications system, and a physical layer model for weather, the operational layer model provides a visualization of a simulation of a mission associated with the mission data, the physical layer models include respective physics-based models of the sensor and the communications system, respectively, and the functional layer models includes models that simulate functions of the sensor and models that simulate functions of the communications system;
identifying, based on a comparison of the physics-based models of the sensor and communications system to a propagation equation that defines physical propagation of a wave from the sensor and a wave from the communications system, any gaps, or inconsistencies between the physics-based models of the sensor and communications system and the propagation equation;
generating a filler model that fills the identified gaps or fixes any identified inconsistencies;
combining the filler model, operational layer, functional layer, and physical layer models of the sensor, communications system, and weather into a simulation model;
executing the simulation model resulting in a visual display of execution of the mission using the sensor and the communications system and a determination of a probability of mission success;
determining the probability of mission success satisfies a specified criterion; and
causing a platform to execute the mission responsive to determining the probability of mission success satisfies the specified criterion.

15. The non-transitory machine-readable medium of claim 14, wherein
combining the filler model, operational layer, functional layer, and physical layer models includes coupling outputs from the operational layer model to inputs of the functional layer models, coupling outputs from the functional layer models to inputs of the physical layers models, coupling outputs of the physical layer models to inputs of the operations layer model, and coupling filler model outputs to either the physical model of the sensor or the physical model of the communications system.

16. The non-transitory machine-readable medium of claim 14, wherein the sensor and the communications system both operate using respective lasers.

17. The non-transitory machine-readable medium of claim 14, wherein the sensor and the communications system both operate using radio frequency (RF) signals.

18. The non-transitory machine-readable medium of claim 14, wherein the operations further include combining the physical layer model of the sensor and the physical layer model of the communications system into a propagation model before comparing the propagation model to the propagation equation.

19. The non-transitory machine-readable medium of claim 18, wherein the operations further include verifying that the propagation model is executable within a specified computer framework.

20. The non-transitory machine-readable medium of claim 19, wherein the operations further include verifying that the simulation model is executable within the specified computer framework before executing the simulation model.

* * * * *